C. A. BRADLEY.
STEERING DEVICE FOR TRACTION ENGINES.
APPLICATION FILED JUNE 5, 1912.
1,056,967.
Patented Mar. 25, 1913.
2 SHEETS—SHEET 1.
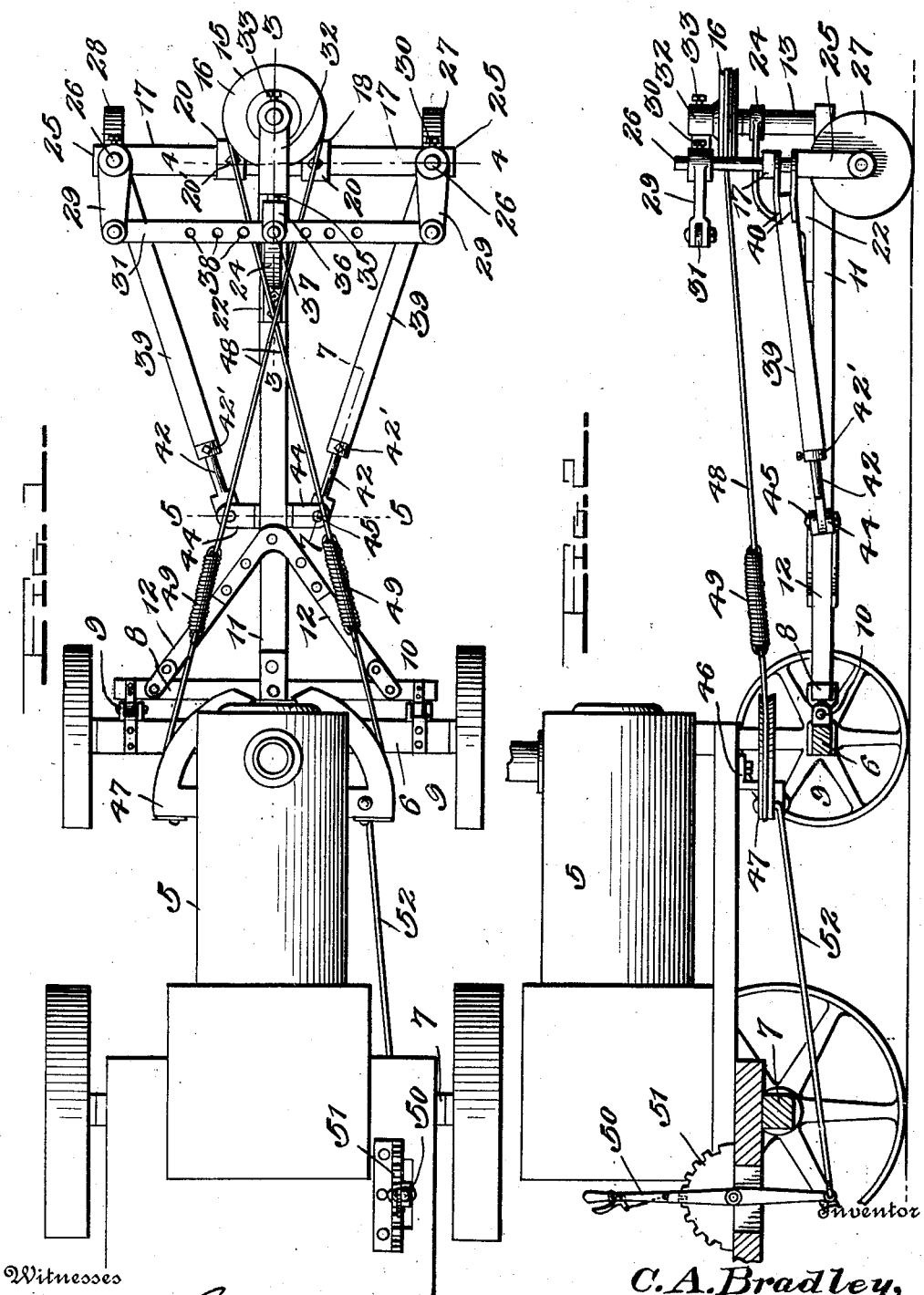
Witnesses
Chas. L. Griesbauer.
A. B. Norton.
Inventor
C. A. Bradley,
By Watson E. Coleman,
Attorney

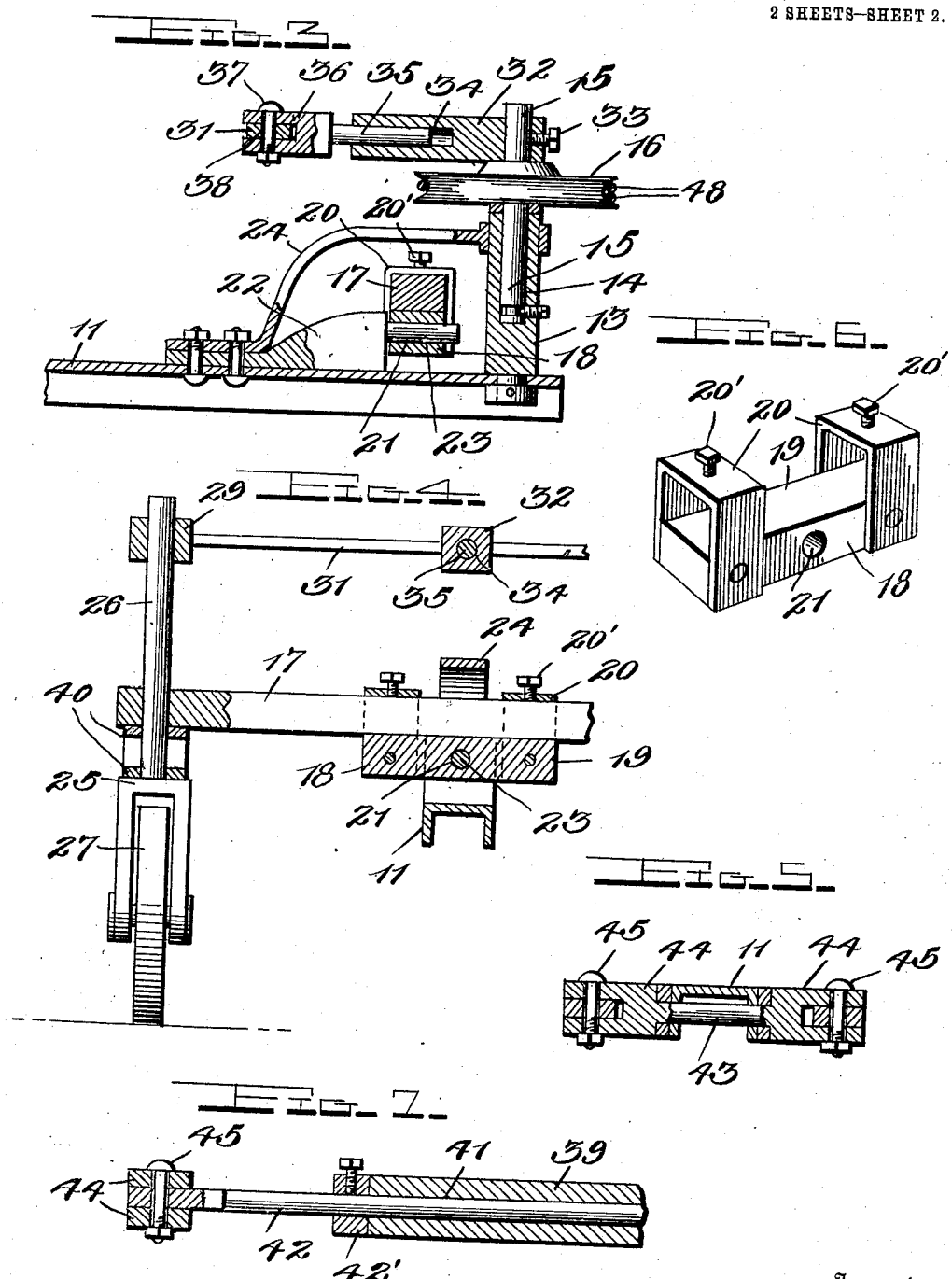

UNITED STATES PATENT OFFICE.

CHARLES A. BRADLEY, OF BURNSTAD, NORTH DAKOTA, ASSIGNOR OF ONE-HALF TO CHARLES HERNETT, OF BURNSTAD, NORTH DAKOTA.

STEERING DEVICE FOR TRACTION-ENGINES.

1,056,967.  Specification of Letters Patent.  Patented Mar. 25, 1913.

Application filed June 5, 1912.   Serial No. 701,925.

*To all whom it may concern:*

Be it known that I, CHARLES A. BRADLEY, a citizen of the United States, residing at Burnstad, in the county of Logan and State of North Dakota, have invented certain new and useful Improvements in Steering Devices for Traction-Engines, of which the following is a specification, reference being had to the accompanying drawings.

This invention relates to steering devices for traction engines and has for its object to provide a simple, efficient and durable device for this purpose whereby the plows are directed or guided in the movement of the machine across the field.

Another object of the invention is to provide improved means for adjusting the steering wheels whereby the device may be used in connection with the traction engine when employed for the purpose of plowing or breaking ground, and may also be used for directing the machine upon the road or highway.

Still another object of the invention resides in the provision of mechanism for the above purpose which is extremely durable and positive in its action and which may be manufactured at comparatively small cost.

With the above and other objects in view as will become apparent as the description proceeds, the invention consists in certain constructions, combinations and arrangements of the parts that I shall hereinafter fully describe and claim.

For a full understanding of the invention, reference is to be had to the following description and accompanying drawings, in which—

Figure 1 is a top plan view of a steering device embodying the present invention showing the same attached to a traction engine; Fig. 2 is a side elevation; Fig. 3 is an enlarged section taken on the line 3—3 of Fig. 1; Fig. 4 is a section taken on the line 4—4 of Fig. 1; Fig. 5 is a section taken on the line 5—5 of Fig. 1; Fig. 6 is a detail perspective view of the sliding bearing member; Fig. 7 is a detail section taken on the line 7—7 of Fig. 1.

Corresponding and like parts are referred to in the following description and designated in the accompanying drawings by like reference characters.

Referring in detail to the drawings, 5 designates generally a traction engine of any approved construction, and 6 and 7 the front and rear supporting axles respectively. Upon the front axle 6 of the engine a bar 8 is mounted by means of the clips or clevises 9 which embrace said bar and are connected thereto at their ends by means of the bolts 10. To the center of this transversely disposed bar a forward longitudinally extending beam 11 is secured. This beam as well as the bar 8 may be constructed of angle iron, or other desired material. Inclined braces 12 connect the ends of the bar 8 to the longitudinal beam 11. The above described construction constitutes the frame upon which the various elements of my improved steering mechanism are mounted. The construction of this steering mechanism will now be described in detail. Upon the forward end of the longitudinal beam 11, a perpendicular post or standard 13 is rigidly fixed at its lower end. The upper end of this standard is longitudinally bored to provide a socket 14 in which the lower end of a spindle 15 is mounted to rotate. Upon this spindle the steering wheel 16 is rigidly fixed. A transversely disposed bar 17 is arranged above the beam 11 at its forward end and upon this beam a sliding bearing 18 is arranged, said bearing including the block 19 and the inverted U shaped metal straps 20. These straps carry set screws 20' whereby the sliding bearing may be rigidly fixed in its adjusted position upon the bar 17. The block 19 is centrally provided with an opening 21 to receive the stud 23 which is formed upon the casting 22, bolted or otherwise rigidly fixed upon the beam 11. One end of a brace bar 24 is secured to the rear end of said casting, the forward end of said brace bar being fixed to the upper end of the post or standard 13 immediately beneath the steering wheel 16. By means of this construction it will be seen that the bar 17 is free to oscillate vertically upon the stud 23. In each end of the bar 17 the spindle 26 of a wheel carrying yoke 25 is mounted to rotate freely. In one of the yokes 25 a furrow wheel 27 is mounted and in the other yoke the ground wheel 28 is mounted to engage upon the land side of the furrow. To the upper end of each of the steering wheel spindles 26 an arm 29 is secured by means of the set screws 30. These arms extend rearwardly and are bifurcated to receive the ends of a transversely disposed steering bar 110

31. An arm 32 is also fixed upon the upper end of the spindle 15 by means of the set screws 33 and is provided with a longitudinal recess or socket 34 to receive the cylindrical shank 35 of a U shaped coupling head 36. The arms of this head are disposed upon opposite sides of the steering bar 31, and are provided with an opening to receive a pin 37. The steering bar 31 is also provided with a series of openings 38 any one of which is adapted to receive said pin.

The forward ends of the diagonally disposed rods 39 are connected to the ends of the transverse bar 17 by means of the strap plates 40 which are fixed to said rods and are disposed above and below the bar 17, said plates being provided with openings through which the steering wheel spindles loosely extend. The rear ends of the rods 39 are tubularly formed as indicated at 41 to receive the rods 42. Upon these rods collars 42′ are adjustably secured by means of suitable set screws whereby the relative sliding movement of said rods and the rods 39 may be adjusted. In the beam 11 a transversely disposed pin 43 is secured and upon the ends of this pin the bifurcated members 44 are loosely mounted for rotative movement. To these members the rear ends of the rods 42 are connected by means of the pivot pins 45.

A suitable bearing indicated at 46 is secured to the forward end of the frame of the traction engine and upon this bearing a wheel segment 47 is pivotally mounted. The forwardly extending curved arms of this wheel segment are preferably grooved to receive the ends of a cable 48. This cable extends around the grooved periphery of the steering wheel 16, and between said steering wheel and the wheel segment 47, the cable is crossed as shown in Fig. 1. Coil springs 49 are interposed in the cable at points adjacent its ends and are adapted to assimilate the shock or jar to the steering mechanism. Upon the rear platform of the traction engine an operating lever 50 is mounted and carries the usual spring pressed dog for locking engagement with the teeth of a rack 51. The lower end of this lever which extends beneath the platform is connected by means of the rod 52 to the wheel segment 47 at one side of its pivotal point.

From the above description the operation of the device will be understood as follows: The steering wheels are first adjusted by sliding the bearing 18 upon the transverse bar 17 so that one of said wheels is disposed in the furrow and the other wheel upon the land side of the furrow. The furrow wheel is preferably provided with a central peripheral flange so that the said wheel will maintain a position in the base of the furrow. With the wheels thus disposed, the engine will be properly steered across the field so that a straight furrow will be plowed. By providing coil springs in the steering cable, slack in the cable is taken up when the furrow wheel changes its position in the furrow or strikes obstructions, and liability of the cable breaking by placing undue strain thereon is thus obviated. When it is desired to employ the steering device for guiding the machine upon the road or highway, the bearing 18 is adjusted upon the bar 17 so as to position the furrow and stubble wheels directly in front of the wheels of the machine. This may be readily done by simply loosening the screws 20′ and the securing screws of the collars 42′, and removing the pin connecting the coupling head 36 to the steering bar 31. The bar 17 may then be shifted transversely, and the bearing block 19 rigidly secured in position on the cross bar. The steering wheels may be readily turned by simply manipulating the lever 50.

From the foregoing it is thought that the construction and manner of operation of my improved steering device will be readily understood. The device may be easily and quickly attached to the front axle of traction engines or other agricultural machines now in general use. Owing to the ease with which the steering wheels may be turned, the operator is relieved of considerable labor incident to the use of such devices designed for the accomplishment of similar functions. It will further be appreciated that owing to the comparatively simple arrangement of the various elements employed, the device as a whole is extremely durable, efficient in its action and may be produced at small cost.

While I have shown and described the preferred construction and arrangement of the various parts, it will be understood that the invention is susceptible of considerable modification without departing from the essential features or sacrificing any of the advantages thereof.

Having thus described the invention what is claimed is:

1. A steering device of the character described comprising a frame and means for securing said frame to a vehicle axle, said frame including a longitudinally extending beam, a transverse bar mounted to oscillate upon said beam, means for adjusting said bar transversely on the beam, steering wheels mounted in the ends of said bar, and means for simultaneously adjusting said wheels.

2. A steering device of the character described comprising a frame and means for attaching the same to a vehicle axle, said frame including a longitudinally extending beam, as oscillatory bearing mounted upon the forward end of said beam, a transverse bar mounted in said bearing, steering wheels mounted upon the ends of said bar, and means for simultaneously adjusting said wheels.

3. A steering device of the character described comprising a frame and means for attaching the same to a vehicle axle, said frame including a longitudinally extending beam, a bearing mounted for oscillatory movement upon the forward end of said beam, a transverse bar longitudinally slidable in said bearing, means for securing the bar in its adjusted position, steering wheels mounted upon the ends of said bar, and connecting means between the ends of the bar and the frame, said connecting means including longitudinally and relatively movable elements.

4. A steering device of the character described comprising a frame and means for attaching the same to a vehicle axle, said frame including a longitudinally extending beam, a transversely adjustable bar mounted to oscillate upon the forward end of said beam, steering wheels mounted in the ends of said bar, and members pivotally connected to the beam and to the ends of said transverse bar and having relative longitudinal sliding movement.

5. A steering device of the character described comprising a frame and means for attaching the same to a vehicle axle, a transversely adjustable bar mounted to oscillate upon said frame, steering wheels mounted in the ends of said bar, rods connected at one of their ends to the ends of said transverse bar, the other ends of said rods being tubularly formed, and rods pivotally mounted upon the frame and telescopically engaged in the tubular ends of said first named rods for longitudinal movement with relation thereto.

6. A steering device of the character described comprising a frame and means for attaching the same to a vehicle axle, a transversely adjustable bar mounted to oscillate upon said frame, steering wheels mounted in the ends of said bar, rods connected to the ends of said bar for lateral movement, said rods having tubular end portions, and rods pivotally connected to the frame at one of their ends for vertical and lateral movement and telescopically engaged in the tubular ends of the first named rods for longitudinal movement with relation thereto.

7. A steering device of the character described comprising a frame and means for attaching the same to a vehicle axle spaced steering wheels mounted upon said frame, arms secured upon the wheel spindles, a steering bar connecting said arms, a rotatable actuating wheel, a connection between the spindle of the actuating wheel and said bar including a rigid arm fixed on the wheel spindle and provided with a longitudinal socket, a member adjustable upon the steering bar and loosely mounted in the socket of said arm, a wheel segment, a cable fixed at its ends to said segment, said cable being crossed and traversing the actuating wheel, coil springs interposed in the cable, and operating means for said wheel segment to rotate the actuating wheel and simultaneously position the steering wheels with relation to the line of movement of the vehicle.

In testimony whereof I hereunto affix my signature in the presence of two witnesses.

CHARLES A. BRADLEY.

Witnesses:
 CHAS. HERNETT,
 A. T. NORDQUIST.

Copies of this patent may be obtained for five cents each, by addressing the "Commissioner of Patents, Washington, D. C."